United States Patent [19]

Yoshino et al.

[11] Patent Number: 4,634,636
[45] Date of Patent: Jan. 6, 1987

[54] POLYACETYLENE COMPOSITE

[75] Inventors: Akira Yoshino, Fujisawa; Kenichi Sanechika, Kawasaki, both of Japan

[73] Assignee: Asahi Kasei Kogyo Kabushiki Kaisha, Osaka, Japan

[21] Appl. No.: 679,399

[22] Filed: Dec. 7, 1984

[30] Foreign Application Priority Data

Dec. 13, 1983 [JP] Japan .................................. 58-233648
Dec. 13, 1983 [JP] Japan .................................. 58-233649

[51] Int. Cl.$^4$ ........................ B32B 27/00; C25B 3/00; H01M 4/60
[52] U.S. Cl. .................................... 428/500; 428/702; 427/407.1; 204/75; 429/212; 252/500; 252/512; 252/518
[58] Field of Search ................ 428/500, 702; 252/500, 252/512, 518

[56] References Cited

U.S. PATENT DOCUMENTS 4,419,277 12/1983 Myers .................... 252/500
4,472,487 9/1984 Maxfield et al. ............ 429/194
4,472,489 9/1984 Maxfield et al. ............ 429/213
4,502,981 3/1985 Delannoy et al. ............ 252/512

FOREIGN PATENT DOCUMENTS

0036118-A3 9/1981 European Pat. Off. .
0036118-A2 9/1981 European Pat. Off. .

Primary Examiner—P. C. Ives
Attorney, Agent, or Firm—Birch, Stewart, Kolasch & Birch

[57] ABSTRACT

Polyacetylene composite comprising a polyacetylene polymer being coated with at least one of the ionic organic compounds such as alkali metal alkoxide type compounds of 1,2-diol, semicarbonic ester derivatives of 1,2-diol, and ortho-ester derivatives; a process for the production of the above composite characterized by applying a solution of the above ionic organic compounds to the polyacetylene polymer; a process for the production of the above composite characterized by placing the polyacetylene polymer as an electrode in an electrolyte containing a cyclic carbonic ester compound and an alkali metal ion and electrochemically reducing the cyclic carbonic ester compound; and a process of using an n-doped polyacetylene composite as a negative electrode active substance for a secondary battery. The ionic organic compound provides a quite high stability to the n-doped polyacetylene and therefore the secondary battery using it as a negative electrode active substance amazingly excells in terms of protracted charge-discharge cycle property, self-discharge property, and voltage-maintaining property.

12 Claims, 8 Drawing Figures

POLYACETYLENE COMPOSITE

BACKGROUND OF THE INVENTION

1. Field of the Invention

The present invention relates to a polyacetylene composite comprising a coating of an ionic organic compound, a process for the production thereof, and a method for the use of the composite.

2. Description of the Prior Art

It has been well known that oxygen-containing organic compounds such as crown ether possess an ability to interact with cation species such as, for example, $Li^+$, $Na^+$, and $K^+$. The present inventors, during an extensive study on the functions possessed by such oxygen-containing organic compounds, have discovered specific ionic organic compounds and have found that these compounds possess an ability to interact specifically with cation species such as $Li^+$, $Na^+$, and $K^+$.

As basic characteristics, the aforementioned compounds possess:

(A) Ionic electrical conductivity
(B) Specific interaction with alkali metal ions
(C) Protective activity manifested against anion species It has been demonstrated that the specific ionic organic compounds bring about a highly conspicuous effect in stabilizing n-doped conjugate type polymers such as polyacetylene.

In recent years, U.S. Pat. Nos. 4,204,216 and 4,222,903 have disclosed that such conjugate type polymers as polyacetylene are produced by n-doping with cation species or p-doping with anion species to manifest phenomenal electrical conductivity. EP-36118 has proposed a secondary battery which makes use of a conjugate type polymer such as polyacetylene. This secondary battery is attracting keen interest as a novel type of secondary battery with an unusually high capacity. Particularly, the polyacetylene which is n-doped with a cation species is expected to be a highly promising candidate for the negative electrode active substance of the non-aqueous type secondary battery which is experiencing a vigorous demand in the trade of secondary batteries. Unfortunately, the aforementioned n-doped polyacetylene disclosed by EP-36118 is unusually unstable and this instability constitutes a serious obstacle to the practical use.

This instability of the n-doped polyacetylene is interpreted to be a fundamental quality ascribable to its extremely active carbanion-like structure. Any effort to impart improved stability to the n-doped polyacetylene has been regarded as nearly impracticable.

SUMMARY OF THE INVENTION

The present inventors have diligently studied this problem from various angles and have, consequently, discovered ionic organic compounds represented by the general formula (I):

$$\begin{array}{c} M^{\oplus}M^{\oplus} \\ X^{\ominus}\ Y^{\ominus} \\ | \quad | \\ R_1-C-C-R_4 \\ | \quad | \\ R_2\ R_3 \end{array} \quad (I)$$

wherein M denotes at least one member selected from the group of alkali metals, X and Y are the same or different and represent —O or

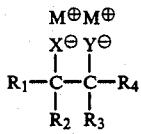

$R_1$, $R_2$, $R_3$, and $R_4$ each are at least one member selected from the group consisting of hydrogen, substituted or unsubstituted alkyl groups of 1 to 5 carbon atoms, and substituted or unsubstituted alkoxy groups of 1 to 5 carbon atoms; or $R_1$ and $R_2$ or $R_3$ and $R_4$ in combination form a cyclic structure. These ionic organic compounds possess an outstanding ability to stabilize an n-doped polyacetylene.

An object of this invention is to provide a polyacetylene composite which comprises a polyacetylene polymer and a coating formed on the polyacetylene polymer with a specific ionic organic compound and which overcomes the disadvantage of polyacetylene due to its inherent instability.

Another object of this invention is to provide a process for the production of the aforementioned polyacetylene composite.

A further object of this invention is to provide a method for the use of the polyacetylene composite.

These and other objects and characteristic features of the present invention will become apparent to those skilled in the art as the disclosure is made in the following description of the preferred embodiment of the invention.

DETAILED DESCRIPTION OF THE INVENTION

Figure 1:
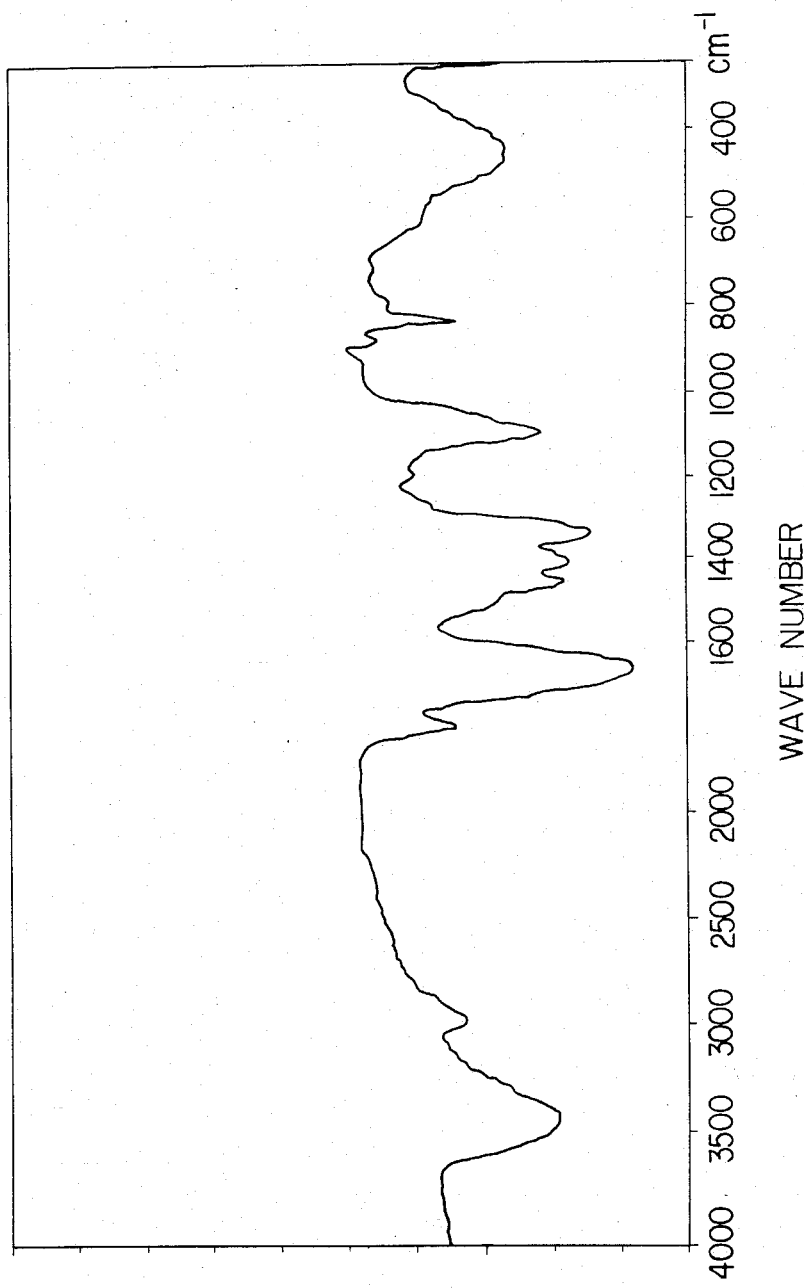
FIG. 1 through FIG. 6 are infrared absorption spectra.

This invention provides a polyacetylene composite which comprises a polyacetylene polymer having a coating formed thereon, the coating containing at least one ionic organic compound represented by the general formula (I):

$$\begin{array}{c} M^{\oplus}M^{\oplus} \\ X^{\ominus}\ Y^{\ominus} \\ | \quad | \\ R_1-C-C-R_4 \\ | \quad | \\ R_2\ R_3 \end{array} \quad (I)$$

wherein M denotes at least one member selected from the group consisting of alkali metals, X and Y are the same and represent —O or

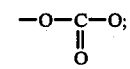

$R_1$, $R_2$, $R_3$, and $R_4$ each are at least one member selected from the group consisting of hydrogen, substituted or unsubstituted alkyl groups of 1 to 5 carbon atoms, and substituted or unsubstituted alkoxy groups of 1 to 5 carbon atoms; or $R_1$ and $R_2$ or $R_3$ and $R_4$ in combination form a cyclic structure.

The term "ionic organic compounds" as used in the present invention means alkoxide derivatives or semicarbonic ester derivatives of 1,2-diol represented by the general formula (I), wherein M is an alkali metal such as lithium, sodium, potassium and the like.

In the general formula (I), X and Y are the same or different and represent —O— or

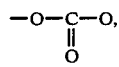

$R_1$, $R_2$, $R_3$, and $R_4$ are at least one member selected from the group consisting of hydrogen atom, substituted or unsubstituted alkyl groups of 1 to 5 carbon atoms, and substituted or unsubstituted alkoxy groups of 1 to 5 carbon atoms. If the aforementioned number of carbon atoms of substituted or unsubstituted alkyl groups and substituted or unsubstituted alkoxy groups is 6 or more, composites to be described afterward are poor in quality and, therefore, the carbon number of the aforementioned alkyl or alkoxy groups should be not more than 5. The cyclic structure may be formed by a combination of $R_1$ and $R_2$ or $R_3$ and $R_4$.

The first group of the ionic organic compounds includes alkali metal alkoxide type compounds of 1,2-diol, which compounds are obtained by reaction of 1,2-diol with alkali metals or with organic alkali metal compounds.

Examples of these compounds are as follows.

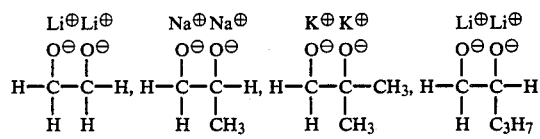

The second group of the ionic organic compounds includes semicarbonic ester derivatives of 1,2-diol which may be obtained by reaction of 1,2-diol with phosgene.

Examples of such compounds are as follows.

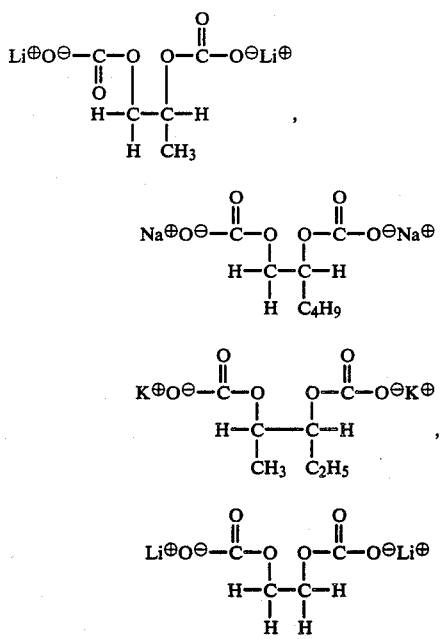

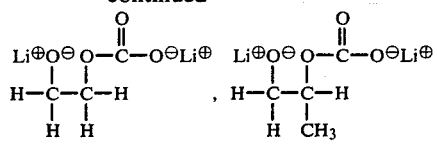

The third group includes ortho-ester derivatives which are represented by, for example, the general formula (II):

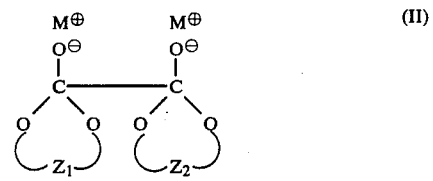

wherein M denotes at least one member selected from the group of alkali metals, $Z_1$ and $Z_2$ are the same or different and each denotes a straight-chain alkylene group of 2 to 5 carbon atoms, a group wherein hydrogen atoms of a straight-chain alkylene group of 2 to 5 carbon atoms are substituted by at least one substituent selected from the class consisting of halogen atoms, alkyl groups, and aryl groups, or a group of the formula of

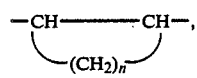

where n denotes an integer of the value of 2 to 5.

The number of carbon atoms of the substituted or unsubstituted straight-chain alkylene group in the general formula (II) is in the range of 2 to 5. If the aforementioned number of carbon atoms is 6 or more, the ability of the compound to interreact with the cation species is too low to conform to the intent of this invention. If the number of carbon atoms is 1, the synthesis of the compound becomes difficult. The value of the integer denoted by n in the group of the formula

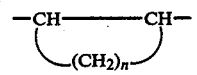

in the general formula (II) is selected in the range of 3 to 5. If this value is 2 or less, the ring is deformed so heavily as to jeopardize its stability. If the value is 6 or more, the synthesis of the compound becomes difficult.

The substituents available for the substituted straight-chain alkylene group include halogen atoms, alkyl groups, and aryl groups. As the halogen atoms available for the substitution, there may be cited flourine, chlorine, bromine, and iodine. As the alkyl groups and aryl groups available for the substitution, there may be cited methyl, ethyl, n-propyl, iso-butyl, n-pentyl, phenyl, tolyl, naphthyl, 4-methoxyphenyl, and 4-chlorophenyl groups.

There may be cited another method which produces the ortho-ester derivatives by subjecting cyclic carbonic esters represented by the general formula (III):

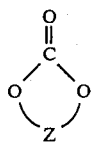
(III)

wherein Z denotes a straight-chain alkylene group of 2 to 5 carbon atoms, a group wherein hydrogen atoms of a straight-chain alkylene group of 2 to 5 carbon atoms are substituted by at least one substituent selected from the class consisting of halogen atoms, alkyl groups, and aryl groups, or a group of the formula of

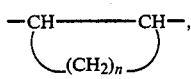

where n denotes an integer of the value of 3 to 5 to a reductive coupling reaction. As methods for the reductive coupling, there are:
(a) the method which causes the compounds represented by the general formula (III) to react with organic metal complexes of alkali metals such as lithium, sodium, or potassium and biphenyl, naphthalene, or anthracene
(b) the method which causes the same compounds to be electrochemically reduced in a supporting electrolyte containing at least one alkali metal ion such as lithium ion, sodium ion, or potassium ion.

The method of (a) is accomplished specifically by causing the compounds of the general formula (III) to react with the organic metal complexes in a solvent such as tetrahydrofuran, dimethoxy ethane, diethoxy ethane, or diethyl ether, for example. Although the reaction temperature is not specifically defined, it may be freely selected in the range of $-100°$ C. to $100°$ C.

The method of (b) is effected specifically by inducing electrochemical reduction in an electrolytic solution comprising an electrolyte which will be described more fully afterward, the compounds of the general formula (III), and optionally a solvent. The reducing potential in this electrochemical reduction is generally selected in the range of $-0.1$ V to $+2.5$ V relative to the lithium standard electrode. In these methods, the ortho-ester derivatives are formed on or near the surface of the electrode. The novel ortho-ester derivatives of the present invention are stable in the absence of a protonic compound such as water and possess an ability to conduct solid ions electrically and interact with alkali metal ions. Thus, they prove highly useful compounds.

Representative examples of the novel ortho-ester derivatives of the present invention and the cyclic carbonic esters as respective starting substances are shown in the following table.

| Cyclic carbonic ester | M | Ortho-ester derivative |
|---|---|---|
| ethylene carbonate (5-membered) | Li | dilithium ortho-ester dimer (from ethylene carbonate) |
| propylene carbonate | Li | dilithium ortho-ester dimer (from propylene carbonate) |
| 6-membered cyclic carbonate (CH₂CH₂CH₂) | Na | disodium ortho-ester dimer |
| 7-membered cyclic carbonate (—(CH₂)₄—) | K | dipotassium ortho-ester dimer |
| 8-membered cyclic carbonate (—(CH₂)₅—) | Li | dilithium ortho-ester dimer |

Since the ionic organic compounds of the present invention possess an ability to conduct ions electrically an interact with alkali metal ions, they manifest outstanding effects when they are combined with n-doped polyacetylene. To be specific, they bring about a prominent effect of profoundly stabilizing the n-doped polyacetylene when they are applied as a coating on the n-doped polyacetylene.

The term "polyacetylene" as used in this invention means a product which is easily obtained in the form of film, power, or gel by polymerizing acetylene in the presence of a Ziegler type catalyst formed of a transition metal compound and an organic metal compound or a catalyst formed of a transition metal compound and a reducing agent, when necessary, in conjunction with a copolymerizable monomer. It is a well-known fact that the polyacetylene readily undergoes the p-type doping through the reaction with an electron accepting compound or through an electrochemical oxidation, and the n-type doping through the reaction with an electron denoting compound or through an electrochemical reduction. Particularly, the n-doped polyacetylene possesses the specific nature as described above, and despite this feature, has found no utility in actual applications because of its instability.

When the ionic organic compound is applied as a coating on the n-doped polyacetylene, it confers upon the polyacetylene notably high stability to withstand the actions of oxygen, carbon dioxide gas, and reactive solvents. This coating also manifests a truly striking effect with respect to the electrochemical reversible stability as described more fully afterward. The coating amount is in the range of 10-300 parts by weight, preferably 50-200 parts by weight, and more preferably, 75-100 parts by weight, based on polyacetylene of 100 parts by weight. As a method for forming this coating, the method which comprises dissolving the ionic organic compound in a solvent and applying the resultant solution on the polyacetylene or the n-doped polyacetylene can be cited in the first place. The solvent to be used for this solution is desirably an aprotic solvent such a dimethyl formamide, dimethyl acetamide, or dimethyl sulfoxide.

As another method available for the formation of the coating, the method which uses polyacetylene as an electrode and causes the ionic organic compound to be directly deposited in the form of a coating on the surface of that electrode through electrochemical reduction may be cited. This method is suitable for forming a very thin coating. This method is carried out by preparing an electrolytic solution containing a cyclic carbonic ester compound represented by the aforementioned general formula (III) and at least one ion selected from the group consisting of the alkali metal ions such as $Li^+$, $Na^+$, and $K^+$, placing polyacetylene as an electrode in the electrolytic solution, and inducing electrochemical reduction in the system. By this procedure, the formation of the orthoester derivative and the n-doping of polyacetylene proceed simultaneously.

In this case, the cyclic carbonic ester may be used directly as a solvent for the electrolytic solution or it may be used in a form diluted with or dissolved in another solvent. The amount of the cyclic carbonic ester to be used should fall in the range of 0.1 to 100% by weight (the weight exclusive of electrolyte), preferably 10 to 100% by weight, based on the solvent of the electrolytic solution. As another solvent usable in the electrolytic solution, there is selected an aprotic solvent which is electrochemically stable in the range of potential favoring the progress of the reduction. Examples of the solvent are tetrahydrofuran, methyl tetrahydrofuran, dimethoxyethane, diethyl ether, acetonitrile, propionitrile, benzene, toluene, xylene, and anisole.

Examples of the electrolyte used for the formation of the electrolytic solution include $LiClO_4$, $LiCl$, $LiBF_4$, $LiBr$, $LiPF_6$, $CH_3SO_3Li$, $CF_3SO_3Li$, $NaClO_4$, $NaBF_4$, $NaPF_6$, $CH_3SO_3Na$, $CF_3SO_3Na$, $KPF_6$, $CH_3SO_3K$, and $CF_3SO_3K$.

The potential range for the promotion of the electrochemical reduction falls in the range of $-0.1$ V to $+2.5$ V relative to the lithium standard electrode potential, preferably in the range of 0.0 to $+1.8$ V in the case of lithium ion, the range of $+0.3$ V to $+1.8$ V in the case of sodium ion, or in the range of $+0.1$ V to $+1.8$ V in the case of potassium ion. The total quantity of electricity to be supplied for the sake of the electrochemical reduction is desired to be an equivalent in the range of 30 to 80 mol%, preferably 35 to 70 mol%, per the CH unit of polyacetylene.

Here, the quantity of electricity, Q (in ampere hour), equivalent to the doping amount, A mol%, per the CH unit of polyacetylene is calculated based on the following formula:

$$A = \frac{Q}{\frac{W}{13} \times 26.8} \times 100$$

In the formula, W stands for the weight (in grams) of the polyacetylene used.

As described above, the n-doped polyacetylene, when coated with the ionic organic compound of this invention, is profoundly stabilized and vested with electrochemically highly stable reversibility and is able to manifest an outstanding performance as a negative electrode active substance in the non-aqueous type secondary battery or solid electrolyte type secondary battery. In the production of such a secondary battery, the n-doped or undoped polyacetylene coated with the ionic organic compound of the present invention obtained by the aforementioned method may be incorporated as a negative electrode. In the case of a non-aqueous type secondary battery, the aforementioned solution prepared for the electrochemical coating treatment can be advantageously used as the electrolytic solution in the secondary battery because it effects an electrochemical coating treatment of naked polyacetylene during the initial charging. Although the positive electrode active substance for the secondary battery is not specifically defined, it may be freely selected from among such positive electrode active substances as $FeS_2$, $TiS_2$, $TiS_3$, $MnO_2$, $Li_{1-x}CoO_2$ (wherein $0 \leq x \leq 1$), $V_2O_5$, $MoO_3$, $CuF_2$, halogen such as iodine, bromine, chlorine, etc., P-type polyacetylene, P-type polyparaphenylene, and P-type polypyrrole.

As non-aqueous electrolytic solutions, the solutions which are obtained by dissolving electrolytes represented by $LiClO_4$, $LiCL$, $LiBr$, $LiBF_4$, $LiPF_6$, $NaClO_4$, $NaBF_4$, $NaPF_6$, $Ch_3SO_3K$, $CF_3SO_3K$, and $KPF_6$ in organic solvents represented by tetrahydrofuran, dimethoxyethane, sulfolan, methylsulfolan, propylene carbonate, ethylene carbonate, γ-butyrolactone, acetonitrile, and propionitrile may be used.

Although the solid electrolyte for use in the electrolytic solution is not specifically defined, it may be selected from among LiI, $LiI(Al_2O_3)$, $Li_3N$, $Na_3Zr_2Si_2PO_{12}$, and $K_2O\ 5.2Fe_2O_3 0.8ZnO$.

The n-doped polyacetylene coated with the ionic organic compound of the invention is highly stable and the secondary battery which uses the coated n-doped polyacetylene mentioned above as a negative electrode active substance amazingly exceeds the conventional n-type polyacetylene in terms of protracted charge-discharge cycle property, self-discharge property, and voltage-maintaining property and proves to be a highly useful secondary battery.

Now, the present invention will be described more specifically below with reference to working examples.

Test 1: (Preparation of polyacetylene)

This test represents a procedure for the preparation of polyacetylene to be used in the following working examples.

In a glass vessel having an inner volume of 800 ml and under an atmosphere of $N_2$ gas, a catalyst was prepared by adding 6 ml of tetrabutoxy titanium and 10 ml of triethyl aluminum to 50 ml of toluene. The vessel was cooled to $-78°$ C., evacuated of the inner gas, swirled to allow the catalyst to be deposited on the inner wall surface thereof, and then supplied with acetylene gas. Immediately a film of polyacetylene was formed on the inner wall surface of the vessel. The vessel was left standing for 15 minutes and the inner gas evacuated. The film was washed five times with 0.5N-HCl-methanol, then dried, and taken out of the vessel.

This film of polyacetylene was thermally treated at 250° C. for five seconds, and then put to use in the following examples.

Test 2:

In 100 ml of tetrahydrofuran was dissolved 1.28 g of naphthalene and 0.14 g of lithium metal was added thereto. The resultant solution was stirred at room temperature for two hours to afford lithium-naphthalene complex. When 2.5 g of propylene carbonate was added dropwise to the resultant solution, a light brown precipitate appeared immediately. This precipitate was separated by filtration under $N_2$, washed with benzene, and dried. Consequently, there was obtained 2.1 g of powdery product.

Figure 2:
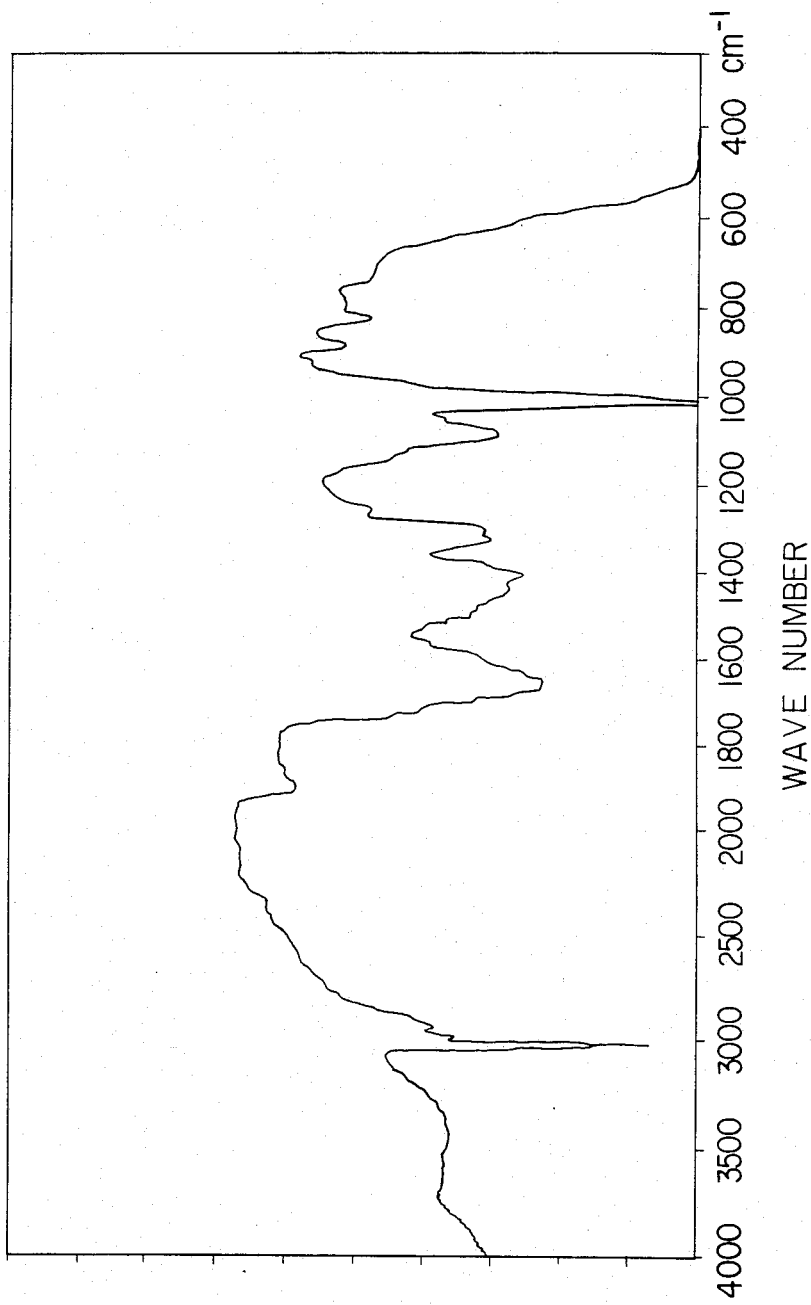

The results of analyses of this powdery product are shown in Table 1 and FIG. 2. The molecular weight of this product was determined by the cryoscopic method using dimethyl sulfoxide as the solvent.

The N.M.R. was determined in the DMSO-d6 solvent and the infrared spectrum measured by the KBr method.

TABLE 3

|  | Test 4 | Test 5 | Test 6 |
|---|---|---|---|
| Cyclic carbonic ester | 1,3-Propanediol carbonic ester | 1,4-Butanediol carbonic ester | 1,5-Pentanediol carbonic ester |
| Elementary analyses |  |  |  |
| Found values | C: 0.335<br>H: 0.044<br>O: 0.341<br>K: 0.284 | C: 0.381<br>H: 0.059<br>O: 0.309<br>K: 0.253 | C: 0.431<br>H: 0.057<br>O: 0.286<br>K: 0.231 |
| Calculated values | C: 0.338<br>H: 0.042<br>O: 0.338<br>K: 0.282 | C: 0.385<br>H: 0.051<br>O: 0.308<br>K: 0.256 | C: 0.424<br>H: 0.059<br>O: 0.282<br>K: 0.235 |

Test 7: (Preparation of $LiCoO_2$)

This test represents a procedure for the preparation of $LiCoO_2$ to be used in the following working examples.

A mixture of 73.9 g of lithium carbonate and 149.9 g of cobalt oxide was pulverized and calcined in an electric furnace at 900° C. for two hours.

After cooling, the obtained blackish gray $LiCoO_2$ was pulverized, then used in the following working examples.

TABLE 1

| Melting Point | Molecular weight | | Elementary analysis | | 1H (60 MHz) N.M.R. | Infrared spectrum |
|---|---|---|---|---|---|---|
|  | Found | Calculated | Found | Calculated | δ |  |
| 150° C. minimum (decomposition) | 223 | 218 | C: 0.437<br>H: 0.058<br>O: 0.443<br>Li: 0.062 | C: 0.440<br>H: 0.055<br>O: 0.440<br>Li: 0.064 | 1.32(d,3H)<br>4.05(t,1H)<br>4.31(t,1H)<br>4.73(m,1H) | FIG. 1 |

Test 3:

In 100 ml of dimethoxyethane was dissolved 1.54 g of biphenyl and 0.46 g of sodium metal was added thereto. The resultant solution was stirred at room temperature for two hours, to afford a sodium-biphenyl complex. When 2.5 g of ethylene carbonate was added to the resultant solution, a light brown precipitate occurred immediately. This precipitate was separated by filtration under $N_2$, washed with benzene, and then dried to obtain 1.9 g of powdery product.

This powdery product was analyzed similarly to the product of Test 2. The results are shown in Table 2.

EXAMPLE 1

A three-electrode electrochemical reaction system was set up by using a 0.6M-$LiClO_4$-propylene carbonate solution as an electrolytic solution and disposing 13 mg of polyacetylene as a working electrode, 50 mg of lithium metal as an counter electrode, and a reference electrode of lithium. A constant current of 5 mA was

TABLE 2

| Melting Point | Molecular weight | | Elementary analysis | | 1H (60 MHz) N.M.R. | Infrared spectrum |
|---|---|---|---|---|---|---|
|  | Found | Calculated | Found | Calculated |  |  |
| 150° C. minimum (decomposition) | 109 | 111 | C: 0.327<br>H: 0.039<br>O: 0.429<br>Na: 0.203 | C: 0.324<br>H: 0.036<br>O: 0.432<br>Na: 0.207 | 3.19(s) | 2950 cm$^{-1}$<br>2850 cm$^{-1}$<br>1640 cm$^{-1}$<br>1400 cm$^{-1}$<br>1315 cm$^{-1}$<br>1095 cm$^{-1}$ |

Tests 4–6

In 100 ml of tetrahydrofuran was dissolved 1.78 g of anthracene and 0.46 g of potassium metal was added thereto. The resultant solution was stirred at room temperature for two hours, to afford a potassium-anthracene complex. When 2.5 g of a varying cyclic carbonic ester indicated in Table 3 was added to the resultant solution, a light brown precipitate invariably occurred immediately. By treating the precipitate by following the procedure of Test 2, there was invariably obtained a powdered product.

The results of analyses of the various products thus obtained are shown in Table 3.

passed for 2.3 hours with the operating electrode as a cathode. During this operation, the quantity of electricity, Q, was 0.0115 Ahr equivalent to a doping amount, A, of 42.9%. During the operation, the potential of the working electrode of polyacetylene relative to the reference electrode changed from +2.7 V to +0.1 V.

Then a constant current of 5 mA was passed with the working electrode used as an anode. In this case, it took 1.1 hours for the potential of the working electrode to reach +2.5 V. Then, the electrolytic solution was withdrawn and the polyacetylene was washed with propylene carbonate and benzene in the order mentioned, and dried.

Figure 3:
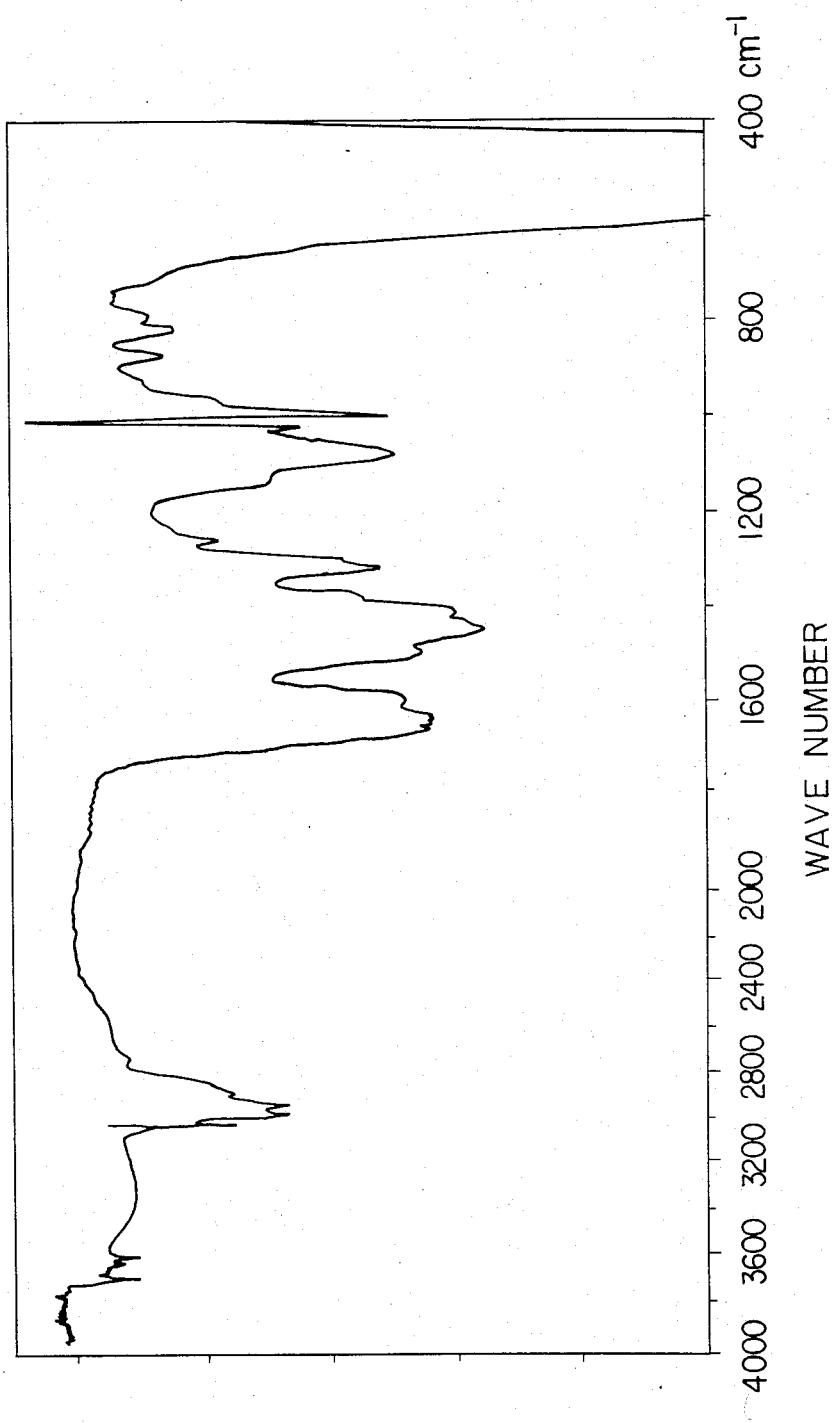

After the drying, the polyacetylene was tested for its infrared spectrum. The infrared spectrum is shown in FIG. 2. The untreated polyacetylene, as a control, was subjected to the same test. The differential spectrum is shown in FIG. 3. The test results clearly demonstrate the formation of a coating. The spectrum agreed with the spectrum (FIG. 1) of the product obtained in Test 2.

From the data, it is noted that the product obtained here was a polyacetylene composite having polyacetylene polymer coated with the ortho-ester derivative obtained in Test 2.

Figure 4:
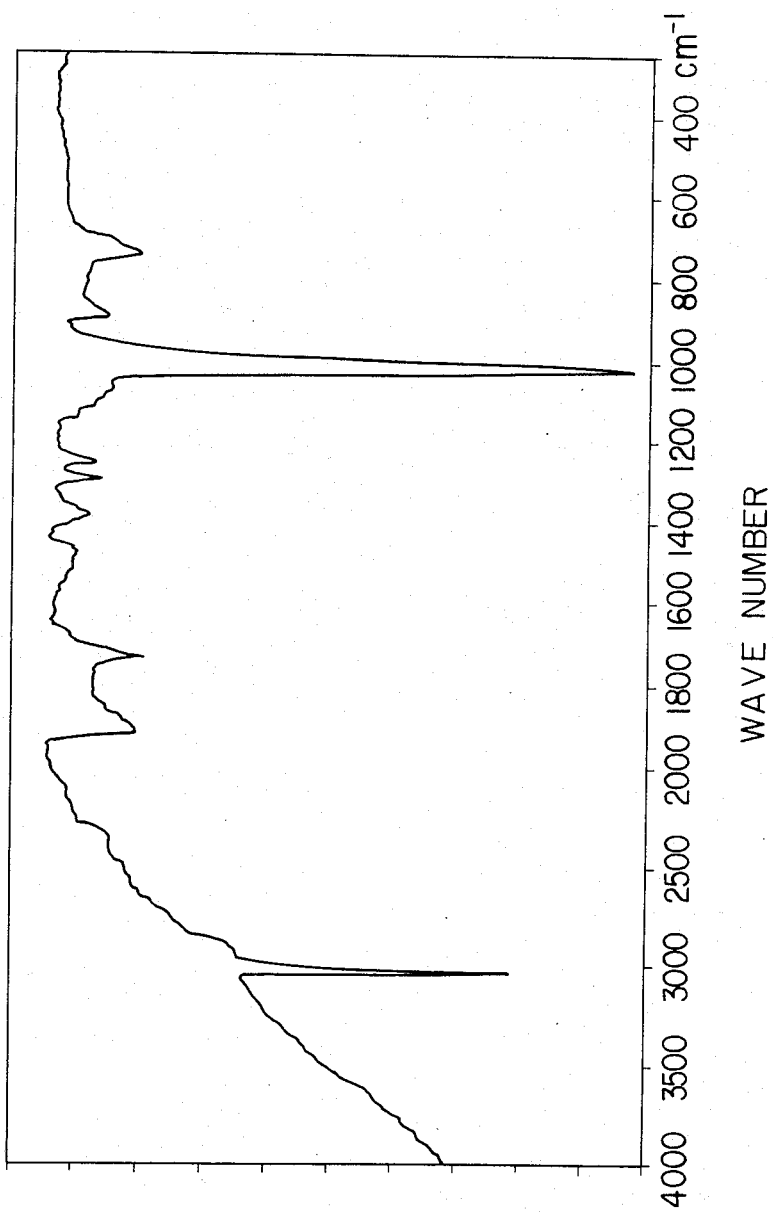
Figure 5:
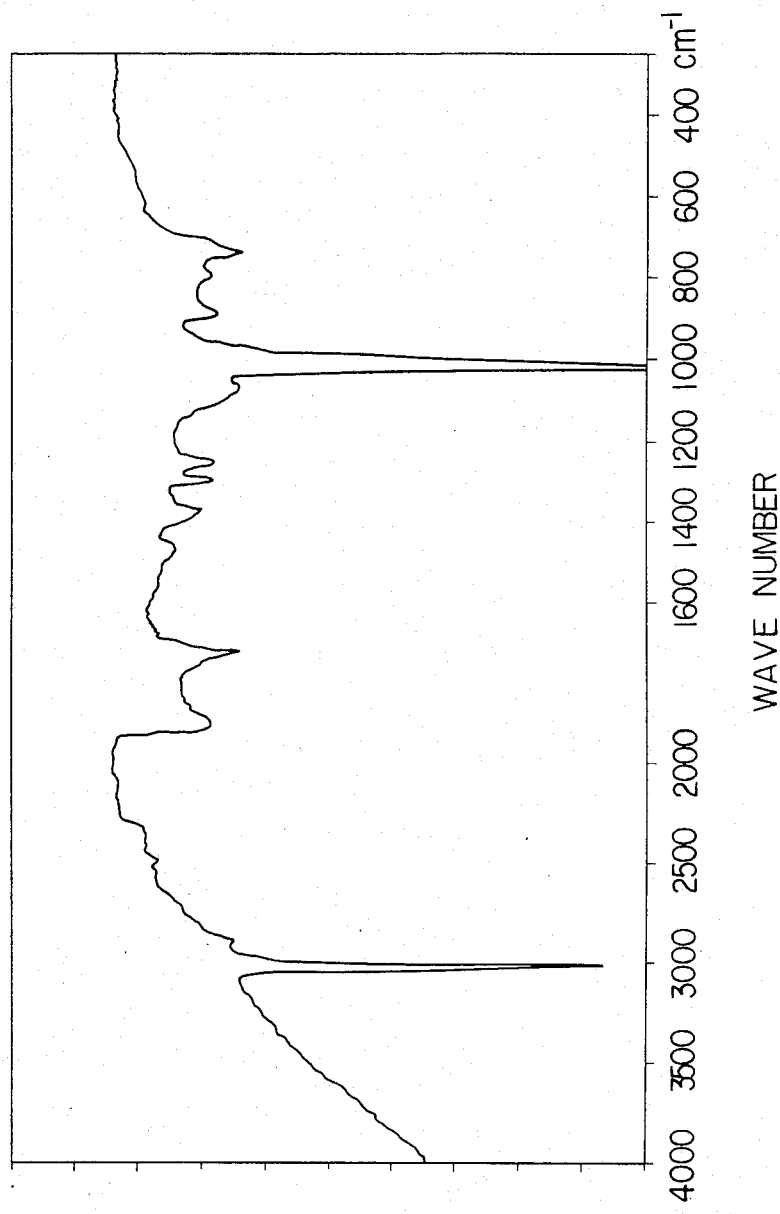

Subsequently, this polyacetylene was immersed and washed in methanol and then dried. The infrared spectrum of the cleaned polyacetylene is shown in FIG. 4. This spectrum agreed with the spectrum (FIG. 5) of the original polyacetylene.

COMPARATIVE EXPERIMENT 1

Figure 6:
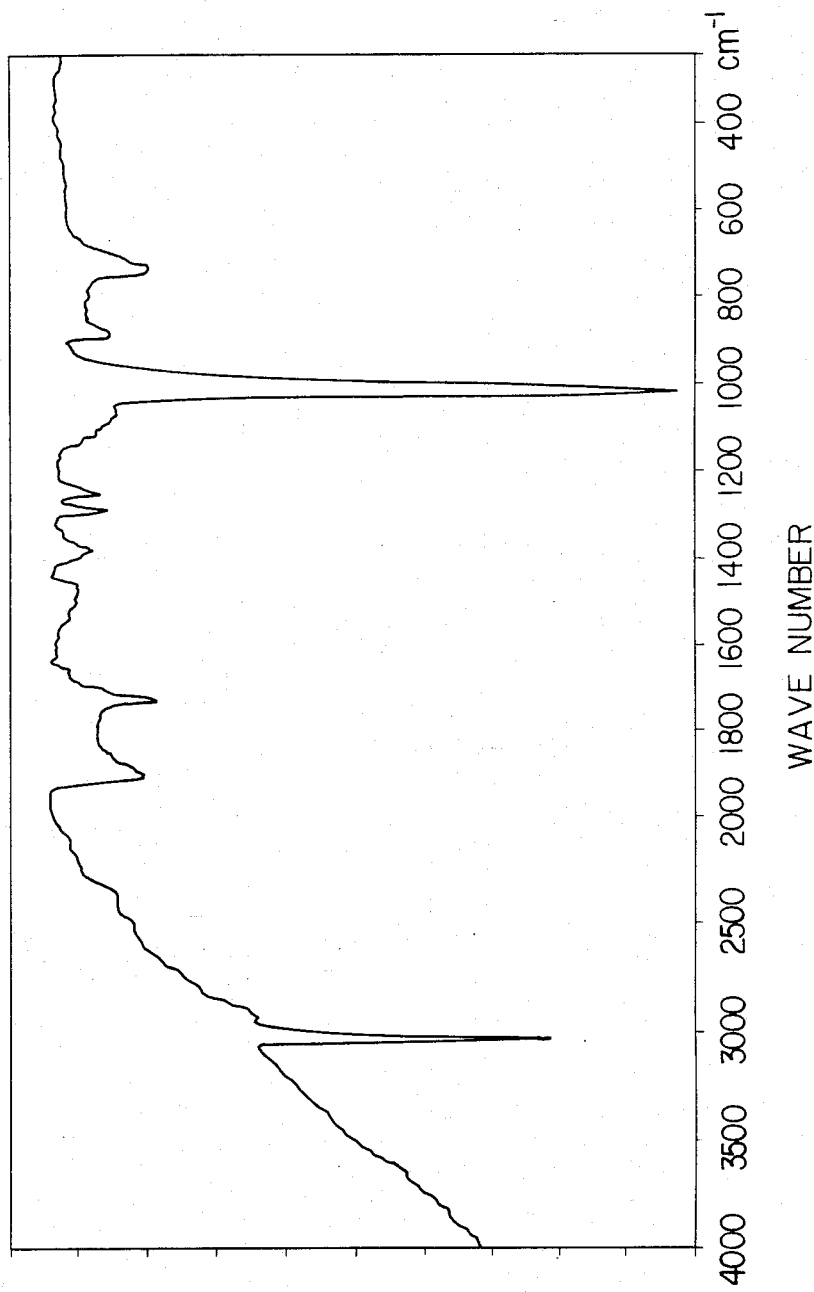

The procedure of Example 1 was repeated, except that tetrahydrofuran was used in the place of propylene carbonate. The infrared spectrum of the polyacetylene after it was washed with tetrahydrofuran is shown in FIG. 6. This infrared spectrum agreed with the spectrum of the original polyacetylene, indicating that no coating was formed during the treatment.

EXAMPLE 2

The electrochemical treatment of Example 1 was repeated by following the procedure of Example 1, except that a 1,3-propanediol carbonic ester/benzene (50:50 in weight ratio) mixture was used in the place of propylene carbonate.

In this case, the quantity of electricity passed, Q, was 0.0113 Ahr, equivalent to a doping amount, A, of 42.2%. During the treatment, the potential of the working electrode of polyacetylene relative to the reference electrode changed from 2.7 V to +0.1 V.

Then a constant current of 5 mA was passed with the working electrode used as an anode. In this case, it took 1.1 hours for the potential to reach +2.5 V. The coating consequently formed was washed and dried by following the procedure of Example 1.

An infrared spectrum was obtained of this polyacetylene. In the spectrum, absorption peaks appeared at 2850-3000 cm$^{-1}$, 1625 cm$^{-1}$, 1400 cm$^{-1}$, 1315 cm$^{-1}$, and 1095 cm$^{-1}$ in addition to the absorption proper to polyacetylene. This spectrum agreed with the spectrum of the compound obtained in Test 4.

EXAMPLE 3

The electrochemical treatment of Example 1 was repeated by following the procedure of Example 1, except that a propylene carbonate/ethylene carbonate mixture (50:50 by weight ratio) was used in the place of propylene carbonate.

During this treatment, the quantity of electricity passed, Q, was 0.0110 Ahr, equivalent to a doping amount, A, of 41.0%. In this case, the potential of the working electrode of polyacetylene relative to the reference electrode changed from 2.7 V to 0.1 V.

Then, a constant current of 5 mA was passed with the working electrode as an anode. It took 1.1 hours for the potential to reach +2.5 V. The coating thus obtained was washed and dried by following the procedure of Example 1. The infrared spectrum obtained of the cleaned coating showed new absorption peaks at 2850-3000 cm$^{-1}$, 1635-1670 cm$^{-1}$, 1400-1410 cm$^{-1}$, 1310-1320 cm$^{-1}$, and 1095 cm$^{-1}$.

EXAMPLE 4

Figure 7:
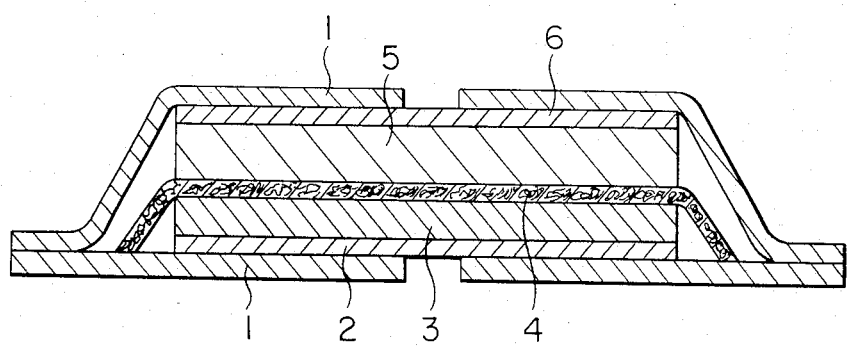
FIG. 7 is a schematic cross section of a paper type battery.

A paper type battery having the cross section of FIG. 7 was prepared by using 1.2 g of polyacetylene as a negative electrode, 3.7 g of $LiCoO_2$ as a positive electrode, and a 0.6M-$LiClO_4$-propylene carbonate solution as electrolytic solution.

In FIG. 7, 1 denotes an external film of Al-laminated polyethylene and 2 a positive electrode current current collector of platinum-plated nickel foil 50μ in thickness and 5 cm×5 cm in area. The collector 2 was fused with the external film 1. 3 denotes a positive electrode active substance, 4 a separator formed of non-woven fabric of polypropylene, 5 a negative electrode active substance, and 6 a negative electrode current collector formed of a nickel foil 50μ in thickness and 5 cm×5 cm in area.

This battery was subjected to initial charging at a constant current of 10 mA for 120 hours. In this case, the quantity of electricity passed, Q, was 1.2 Ahr, equivalent to a doping amount of 48.5%.

The battery was subjected to a constant current (50 mA) charge-discharge test under the conditions of 4.5 V of final voltage for recharging and 2.5 V of final voltage for discharging.

Figure 8:
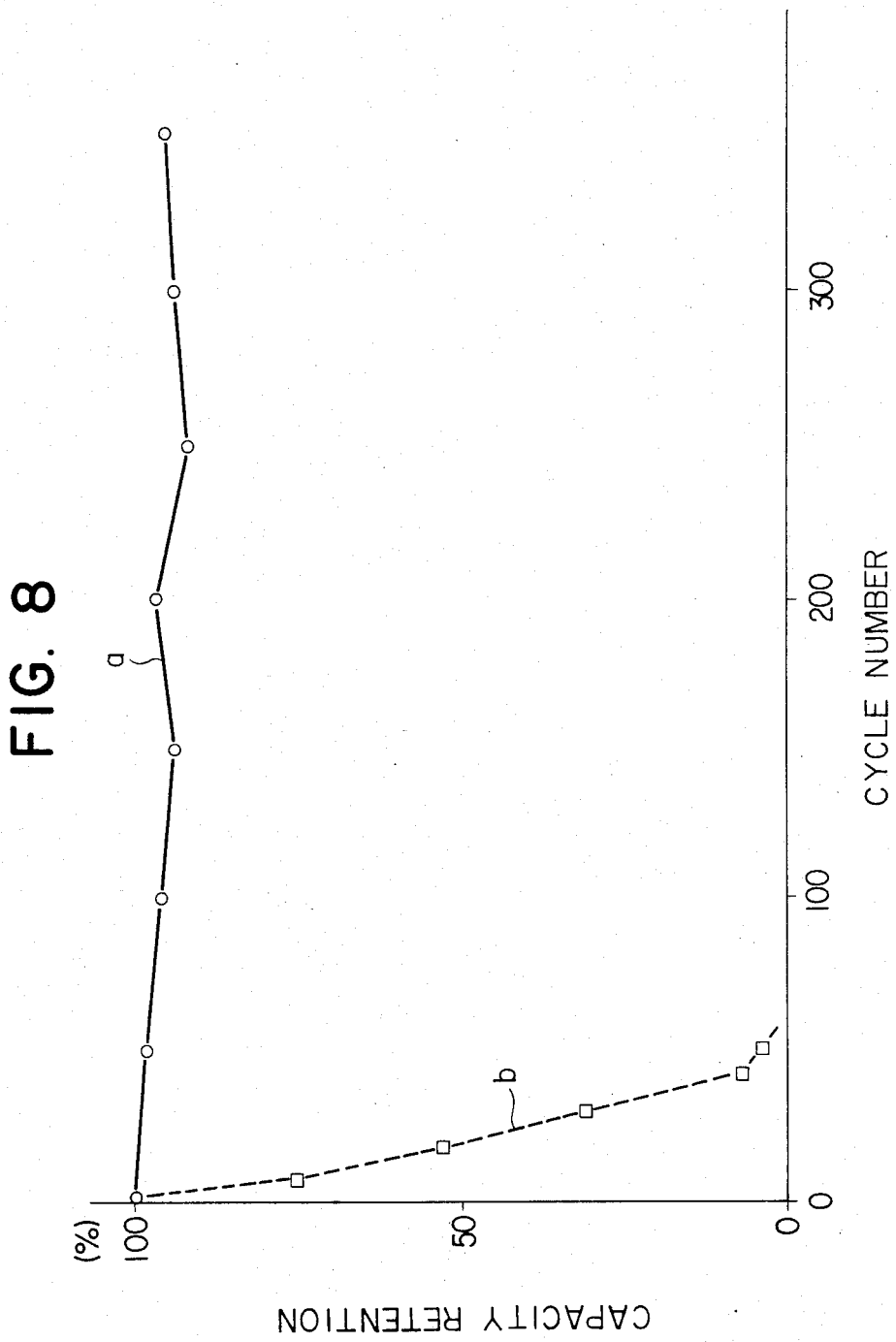
FIG. 8 is a graph showing the results of a cycle test.

At the time of charging treatment, the battery showed characteristics of open circuit voltage of 4.45 V and the average discharge voltage of 4.1 V. Table 4 and Table 5 show fundamental characteristics of the battery at the time of cycling. FIG. 8a shows the results of a cycle test.

TABLE 4

| Charging characteristics | | Discharging characteristics | | | Energy |
|---|---|---|---|---|---|
| Time | Electrical quantity | Time | Electrical quantity | Current efficiency | density (Total amount) |
| 10.7 hrs | 0.535 Ahr | 10.3 hrs | 0.519 Ahr | 97.0% | 161 Whr/kg |

TABLE 5

| | (Self-discharge rate) | | | |
|---|---|---|---|---|
| Temp. | 2 hours | 24 hours | 240 hours | 720 hours |
| 20° C. | 0% | 1.5% | 7.8% | 10.8% |
| 40° C. | 0% | 1.1% | 5.3% | 9.9% |

EXAMPLE 5

The procedure of Example 4 was repeated except that the 0.6M-$LiClO_4$-propylene carbonate solution was replaced by a 0.6M-$LiClO_4$-ethylene carbonate/benzene (50:50 by weight ratio) solution.

This battery was subjected to initial charging at a constant current of 10 mA for 120 hours. In this case, the quantity of electricity passed, Q, was 1.3 Ahr, equivalent to a doping amount of 52.5%.

The battery was subjected to a constant current (50 mA) charge-discharge test under the conditions of 4.5 V of final voltage for recharging and 2.5 V of final voltage for discharging.

At the time of charging treatment, the battery showed characteristics of open circuit voltage of 4.45 V and the average discharge voltage of 4.1 V. Table 6 and Table 7 show fundamental characteristics of the battery at the time of cycling.

EXAMPLE 6

The procedure of Example 4 was repeated except that the 0.6M-LiClO$_4$-propylene carbonate solution was replaced by a 0.6M-LiClO$_4$-γ-butyrolactone/ethylene carbonate (50:50 by weight ratio) solution.

This battery was subjected to initial charging at a constant current of 10 mA for 120 hours. In this case, the quantity of electricity passed, Q, was 1.1 Ahr, equivalent to a doping amount of 44.5%.

The battery was subjected to a constant current (50 mA) charge-discharge test under the conditions of 4.5 V of final voltage for recharging and 2.5 V of final voltage for discharging.

At the time of charging treatment, the battery showed characteristics of open circuit voltage of 4.45 V and the average discharge voltage of 4.1 V. Table 6 and Table 7 show fundamental characteristics of the battery at the time of cycling.

COMPARATIVE EXPERIMENT 2

The procedure of Example 4 was repeated except that LiCoO$_2$ was replaced by 3.7 g of natural graphite.

From the start, this battery was subjected to a constant current (50 mA) charge-discharge test without initial electrochemical treatment, under the conditions of 4.5 V of final voltage for recharging and 2.5 V of final voltage for discharging.

In this case, the quantity of electricity passed, Q, during initial charging, was 0.095 Ahr, equivalent to a doping amount of 8.6%.

The results are shown in Table 6, Table 7 and FIG. 8b.

TABLE 6

| | Charging characteristics | | Discharging characteristics | | Current effi-ciency | Energy density (Total amount) |
|---|---|---|---|---|---|---|
| | Time | Electrical quantity | Time | Electrical quantity | | |
| Example 5 | 9.9 hrs | 0.495 Ahr | 9.1 hrs | 0.455 Ahr | 91.9% | 141 Whr/kg |
| Example 6 | 10.1 hrs | 0.505 Ahr | 9.3 hrs | 0.465 Ahr | 92.1% | 144 Whr/kg |
| Comparative Experiment 2 | 1.9 hrs | 0.095 Ahr | 1.3 hrs | 0.065 Ahr | 68.4% | 20 Whr/kg |

TABLE 7

| | (Self-discharge rate at 20° C.) | | | |
|---|---|---|---|---|
| | 2 hours | 24 hours | 240 hours | 720 hours |
| Example 5 | 0% | 3.0% | 8.9% | 15.1% |
| Example 6 | 0% | 1.7% | 8.1% | 13.9% |
| Comparatve Experiment 2 | 13.1% | 29.0% | ~100% | — |

EXAMPLE 7

A dimethylformamide solution of $$Li^{\oplus}O^{\ominus}-CH_2-\underset{\underset{CH_3}{|}}{CH}-O^{\ominus}Li^{\oplus}$$

was applied to a polyacetylene coating and dried at 50° C. in a vacuum. This procedure was repeated five times. As a result, there was prepared a polyacetylene composite having a coating of $$Li^{\oplus}O^{\ominus}-CH_2-\underset{\underset{CH_3}{|}}{CH}-O^{\ominus}Li^{\oplus}$$

of 77 parts by weight relative to 100 parts by weight of polyacetylene.

A paper type battery shown in FIG. 7 was prepared by using the above polyacetylene composite of 2.3 g as a negative electrode, LiCoO$_2$ of 3.7 g as a positive electrode, and a 0.3M-LiClO$_4$-methylsulforan solution as an electrolytic solution.

The battery was subjected to a constant current (50 mA) charge-discharge cycle test under the conditions of 4.5 V of final voltage for recharging and 2.5 V of final voltage for discharging. Changes of capacity retention arising along with the cycle test are shown in Table 8.

EXAMPLE 8

A dimethylformamide solution of $$Li^{\oplus}O^{\ominus}-\underset{\underset{O}{\|}}{C}-O-CH_2-CH_2-O-\underset{\underset{O}{\|}}{C}-O^{\ominus}Li^{\oplus}$$

was applied to a polyacetylene coating and dried at 50° C. in a vacuum. This procedure was repeated seven times. As a result, there was prepared a polyacetylene composite having a coating of $$Li^{\oplus}O^{\ominus}-\underset{\underset{O}{\|}}{C}-O-CH_2-CH_2-O-\underset{\underset{O}{\|}}{C}-O^{\ominus}Li^{\oplus}$$

of 91 parts by weight relative to 100 parts by weight of polyacetylene.

A paper type battery shown in FIG. 7 was prepared by using the above polyacetylene composite of 2.5 g as a negative electrode, LiCoO$_2$ of 3.7 g as a positive electrode, and a 0.3M-LiClO$_4$-methylsulforan solution as an electrolytic solution.

The battery was subjected to a constant current (50 mA) charge-discharge cycle test under the conditions of 4.5 V of final voltage for recharging and 2.5 V of final voltage for discharging. Changes of capacity retention arising along with the cycle test are shown in Table 8.

COMPARATIVE EXPERIMENT 3

The procedure of Example 7 was repeated, except that the $$Li^{\oplus}O^{\ominus}-CH_2-\underset{\underset{CH_3}{|}}{CH}-O^{\ominus}Li^{\oplus}$$

was not used, to prepare a paper type battery shown in FIG. 7. The battery was subjected to the charge-discharge cycle test under the same condition with Example 7. The results are shown in Table 8.

TABLE 8

| | (Capacity retention) | | | | |
|---|---|---|---|---|---|
| Number of cycle | 10 | 25 | 50 | 100 | 200 |
| Example 7 | 98% | 95% | 90% | 81% | 73% |
| Example 8 | 99% | 97% | 93% | 89% | 89% |
| Comparative | 81% | 47% | 29% | 11% | 9% |

TABLE 8-continued

| Number of cycle | (Capacity retention) | | | | |
|---|---|---|---|---|---|
|  | 10 | 25 | 50 | 100 | 200 |
| Experiment 3 | | | | | |

What is claimed is:

1. A polyacetylene composite comprising a polyacetylene polymer having a coating formed thereon, said coating containing at least one ionic compound represented by the general formula (I):

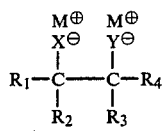

wherein M denotes at least one member selected form the group consisting of alkali metals; X and Y are the same or different and represent —O or

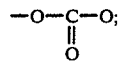

$R_1$, $R_2$, $R_3$, and $R_4$ each are at least one member selected from the goup consisting of hydrogen, substituted or unsubstituted alkyl groups of 1 to 5 carbon atoms, and substituted or unsubstituted alkoxy groups of 1 to 5 carbon atoms, or $R_1$ and $R_2$ or $R_3$ and $R_4$ in combination form a cyclic structure.

2. A polyacetylene composite according to claim 1, wherein the cyclic structure contains two oxygen atoms.

3. A polyacetylene composite according to claim 1, wherein the ionic organic compound represented by the general formula (I) is an ortho-ester derivative represented by the general formula (II):

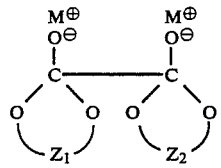

wherein M denotes at least one member selected from the group consisting of alkali metals, $Z_1$ and $Z_2$ are the same or different and each denotes a straight-chain alkylene group of 2 to 5 carbon atoms, a straight-chain alkylene group of 2 to 5 carbon atoms substituted by at least one substituent selected from the group consisting of halogen atoms, alkyl groups, and aryl groups, or a group of the formula

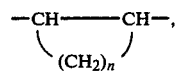

where n denotes an integer of 2 to 5.

4. A polyacetylene composite according to claim 1, wherein the ionic organic compound represented by the general formula (I) is an alkoxide derivative of 1,2-glycol.

5. A polyacetylene composite according to claim 1, wherein the ionic organic compound represented by the general formula (I) is a semicarbonic ester derivative of 1,2-glycol.

6. A polyacetylene composite according to claim 1, wherein M is at least one member selected from the group consisting of lithium, sodium, and potassium.

7. A polyacetylene composite according to claim 1, wherein M is lithium.

8. A polyacetylene composite according to claim 3, wherein $Z_1$ and $Z_2$ each are at least one member selected from the group consisting of —$CH_2$—$CH_2$—,

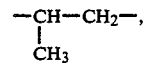

—$CH_2$—$CH_2$—$CH_2$—, —$CH_2$—$CH_2$—$CH_2$—$CH_2$—, and —$CH_2$—$CH_2$—$CH_2$—$CH_2$—$CH_2$—.

9. A polyacetylene composite according to claim 3, wherein $Z_1$ and $Z_2$ each are —$CH_2$—$CH_2$—.

10. A polyacetylene composite according to claim 3, wherein $Z_1$ and $Z_2$ each are

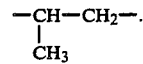

11. A polyacetylene composite according to claim 1, wherein the polyacetylene polymer is n-doped.

12. A polyacetylene composite according to claim 3, wherein the polyacetylene polymer is n-doped.

* * * * *